United States Patent
Teggatz et al.

(10) Patent No.: US 11,347,989 B2
(45) Date of Patent: *May 31, 2022

(54) TRANSMITTING TAG

(71) Applicant: Semtech Corporation, Camarillo, CA (US)

(72) Inventors: Ross Eliot Teggatz, The Colony, TX (US); Paul James Garrity, Rockwall, TX (US); Marc Philippe Daniel Pegulu, La Jolla, CA (US)

(73) Assignee: SEMTECH CORPORATION, Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/026,994

(22) Filed: Sep. 21, 2020

(65) Prior Publication Data

US 2021/0004656 A1 Jan. 7, 2021

Related U.S. Application Data

(63) Continuation of application No. 16/160,306, filed on Oct. 15, 2018, now Pat. No. 10,783,418.

(60) Provisional application No. 62/573,031, filed on Oct. 16, 2017.

(51) Int. Cl.
| | | |
|---|---|---|
| G06K 19/06 | (2006.01) |
| G06K 19/07 | (2006.01) |
| G06K 19/073 | (2006.01) |
| G06K 19/077 | (2006.01) |

(52) U.S. Cl.
CPC ... *G06K 19/0702* (2013.01); *G06K 19/07345* (2013.01); *G06K 19/07739* (2013.01); *G06K 19/07749* (2013.01)

(58) Field of Classification Search
CPC ......... G06K 19/0702; G06K 19/07345; G06K 19/07739
USPC ........................................................ 235/492
See application file for complete search history.

(56) References Cited

U.S. PATENT DOCUMENTS

| | | | |
|---|---|---|---|
| 6,708,050 B2 * | 3/2004 | Carim ..................... | A61N 1/30 600/372 |
| 8,061,623 B2 | 11/2011 | Balchaytis ....... | G06K 19/07743 235/487 |
| 10,068,422 B2 | 9/2018 | Gadher et al. | |
| 10,122,842 B2 | 11/2018 | Lee et al. | |

(Continued)

FOREIGN PATENT DOCUMENTS

| | | |
|---|---|---|
| WO | 01/69524 | 9/2001 |
| WO | 2016/024035 | 2/2016 |
| WO | 2017/027828 | 2/2017 |

OTHER PUBLICATIONS

Notification of Transmittal of the International Search Report and Written Opinion of the International Searching Authority—The European Patent Office—for International Application No. PCT/US2018/055842, dated Mar. 20, 2019, 15 pages.

(Continued)

*Primary Examiner* — Ahshik Kim
(74) *Attorney, Agent, or Firm* — Jackson Walker LLP; Christopher J. Rourk

(57) ABSTRACT

A tag is provided that includes a battery having a printed anode and cathode. A printed circuit connection layer is formed in one of the anode or the cathode. A printed antenna is formed in one of the anode or the cathode. A low-power transmitter coupled to the circuit connection layer.

20 Claims, 8 Drawing Sheets

(56) References Cited

U.S. PATENT DOCUMENTS

| | | | |
|---|---|---|---|
| 10,128,913 B2 | 11/2018 | Kunc et al. | |
| 10,141,982 B2 | 11/2018 | Smith | |
| 10,146,968 B2 | 12/2018 | Suzuki | |
| 10,154,370 B2 | 12/2018 | Hansen | |
| 10,158,401 B2 | 12/2018 | Hull et al. | |
| 10,165,129 B2 | 12/2018 | Sugaya | |
| 10,169,625 B1 | 1/2019 | Diorio et al. | |
| 10,181,995 B2 | 1/2019 | Mizoguchi | |
| 10,185,851 B2 | 1/2019 | Lee et al. | |
| 10,187,456 B2 | 1/2019 | Glommen et al. | |
| 10,191,679 B2 | 1/2019 | Lee | |
| 10,192,373 B1 | 1/2019 | Patterson | |
| 10,198,680 B2 | 2/2019 | Kunc et al. | |
| 10,261,745 B2 | 4/2019 | Lee et al. | |
| 10,275,739 B2 | 4/2019 | Hanis et al. | |
| 2003/0231106 A1 | 12/2003 | Shafer | |
| 2007/0243459 A1 | 10/2007 | Jenson | A61N 1/3787 |
| | | | 429/122 |
| 2009/0134218 A1 | 5/2009 | Yuzon | G07F 7/1016 |
| | | | 235/382 |
| 2010/0060456 A1 | 3/2010 | Forster | |
| 2010/0196744 A1 | 8/2010 | Tucholski | G06K 19/0702 |
| | | | 429/7 |
| 2013/0049348 A1 | 2/2013 | Lemna | B42F 21/04 |
| | | | 283/67 |
| 2013/0342419 A1 | 12/2013 | Takigahira et al. | |
| 2017/0042119 A1* | 2/2017 | Garrity | A01K 11/008 |
| 2018/0123233 A1* | 5/2018 | Bourilkov | H01M 10/4264 |

OTHER PUBLICATIONS

Response to Office Action filed Dec. 11, 2020 in the European Patent Office for co-pending EP Patent Application No. EP18829525. 7, 24 pages.

* cited by examiner

TRANSMITTING TAG

RELATED APPLICATIONS

This non-provisional application is a continuation of U.S. patent application Ser. No. 16/160,306 filed Oct. 15, 2018, which claims benefit of and priority to U.S. Provisional Application Ser. No. 62/573,031 filed Oct. 16, 2017, each of which are hereby incorporated by reference for all purposes, as if presented herein in their entireties.

TECHNICAL FIELD

The present disclosure relates generally to transmitting tags and, more specifically, to a transmitting tag comprising a printable battery.

BACKGROUND OF THE INVENTION

Transmitting tags are known, such as Radio Frequency Identification (RFID) tags. Passive RFID involves sending small amounts of energy and signals to a device in close proximity to the transmitter. The transmitted energy provides enough power for the RFID tag to process information and to send back a signal to the transmitter, thus providing an identification of the device that contains the RFID tag. Passive RFID tags are only powered when in close proximity to the transmitter (e.g. less than 1 meter) and are incapable of sending information long distances.

Active RFID tags can be powered by a power source such as a battery. Active RFID tags are capable of collecting information and relaying that information back to the transmitter. However, the drain on the battery presents problems with need to frequently replace the batteries in the field. Active RFID tags are also relatively expensive due to the expense of the battery.

Both active and passive RFID circuits suffer from limited range. Standard methods of producing RFID tags can require applications to accommodate a physically rigid device, particularly in applications that require battery-powered devices.

SUMMARY OF THE INVENTION

A tag is provided that includes a battery having a printed anode and cathode. A printed circuit connection layer is formed in one of the anode or the cathode. A printed antenna is formed in one of the anode or the cathode. A low-power transmitter is connected to the circuit connection layer.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
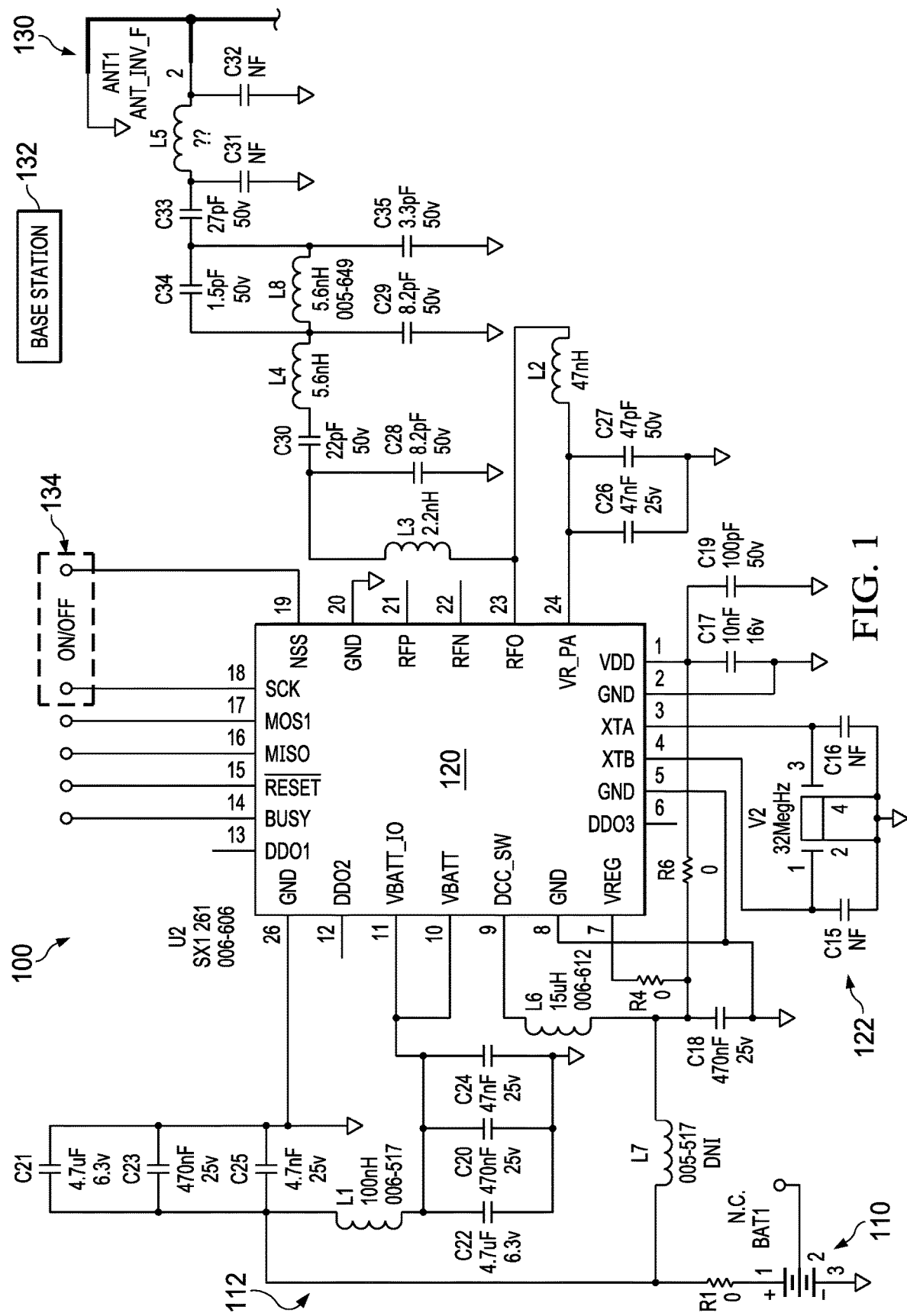
FIG. 1 is a diagram of a transmitting tag 100, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

The present disclosure solves the above-described problems and provides a distinct advance to low cost radio identification tags capable of transmitting information over long distances. Specifically, the present disclosure includes a battery produced by a printing process, circuit connections produced with the printing process, and a low-power long-range transmitter coupled to the circuit connections. The low-cost printing process which produces both the circuit connections and the battery significantly reduces the cost of the overall system. The use of a low-power long-range transmitter provides extremely long battery life while simultaneously allowing long range transmission from the tag. The printable battery also allows physical flexibility of the tag, allowing use in many more applications than would be possible with a physically inflexible tag.

The following detailed description of the disclosure references the accompanying drawings that illustrate specific embodiments in which the disclosure can be practiced. The embodiments are intended to describe aspects of the disclosure in sufficient detail to enable those skilled in the art to practice the disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integration of the embodiments described herein.

FIG. 1 is a diagram of a transmitting tag 100, in accordance with an example embodiment of the present disclosure. Transmitting tag 100 includes battery 110, impedance network 112, antenna circuitry 130, long-range transceiver 120, crystal circuitry 122 and removable on/off tab 134, and is configured to communicate with base station 132, such as by including an application-specific integrated circuit (ASIC), a field programmable gate array (FPGA) or a processor and firmware algorithms that cause the processor to receive a data input and to encode the data input for transmission over antenna circuitry 130, and to receive encoded data from antenna circuitry 130 and to decode the encoded data.

Long-range transceiver 120 can be a transceiver or transmitter described in U.S. Pat. No. 7,791,415, which is hereby incorporated by reference for all purposes as if set forth herein in its entirety, or other suitable transceivers or transmitters. In one example embodiment, long-range transceiver 120 can be a LoRa™ transceiver including LoRa™ wireless RF technology by Semtech Corporation of Camarillo, Calif., which provides low-power transmission over distances up to 10 kilometers. Long-range transceiver 120 can include inputs for receiving an oscillator input from oscillator circuit 122, inputs to transmit and/or receive data signals from antenna circuitry 130, battery monitoring and power inputs from battery 110 and impedance network 112, and other suitable controls as shown, such as on/off controls and reset controls.

Standard transmission technologies generally use frequency-shift keying to transmit digital bits of information, where a transmission frequency is modulated into a single upper frequency or a single lower frequency to represent a binary 0 or 1, and where the modulated signal can be decoded by a receiver. Alternatively, LoRa™ or other suitable long-range data transmission technology can use a fractional-N phase-locked-loop to generate a modulated frequency that differs in up-frequency rate from down-frequency rate with great accuracy. The remote receiver can decode data that is encoded in this manner to receive data, and can encode data in this manner to transmit the data to transmitting tag 100.

Impedance network 112 is configured to allow a printed battery to be used, such as by matching power consumption by long range transceiver 120 to power production capability of battery 110 for a printed battery. For example, the use of three parallel capacitances in series with an inductance, as shown, where the capacitance values are an order of magnitude different from each other in conjunction with a resistive-inductive input to a voltage regulation input to long range transceiver 120.

Removable on/off tab 134 is configured to interrupt a conducting path that will actuate transmitting tag 100 until it is removed. In one example embodiment, removable on/off tab 134 can be an insulating material that is disposed between two conductive layers that are under pressure and which form a contact when removable on/off tab 134 is removed. In an alternative embodiment, removable on/off tab 134 can create a conducting path by placing a conductor in contact with electrical contacts, or in other suitable manners.

Figure 2:
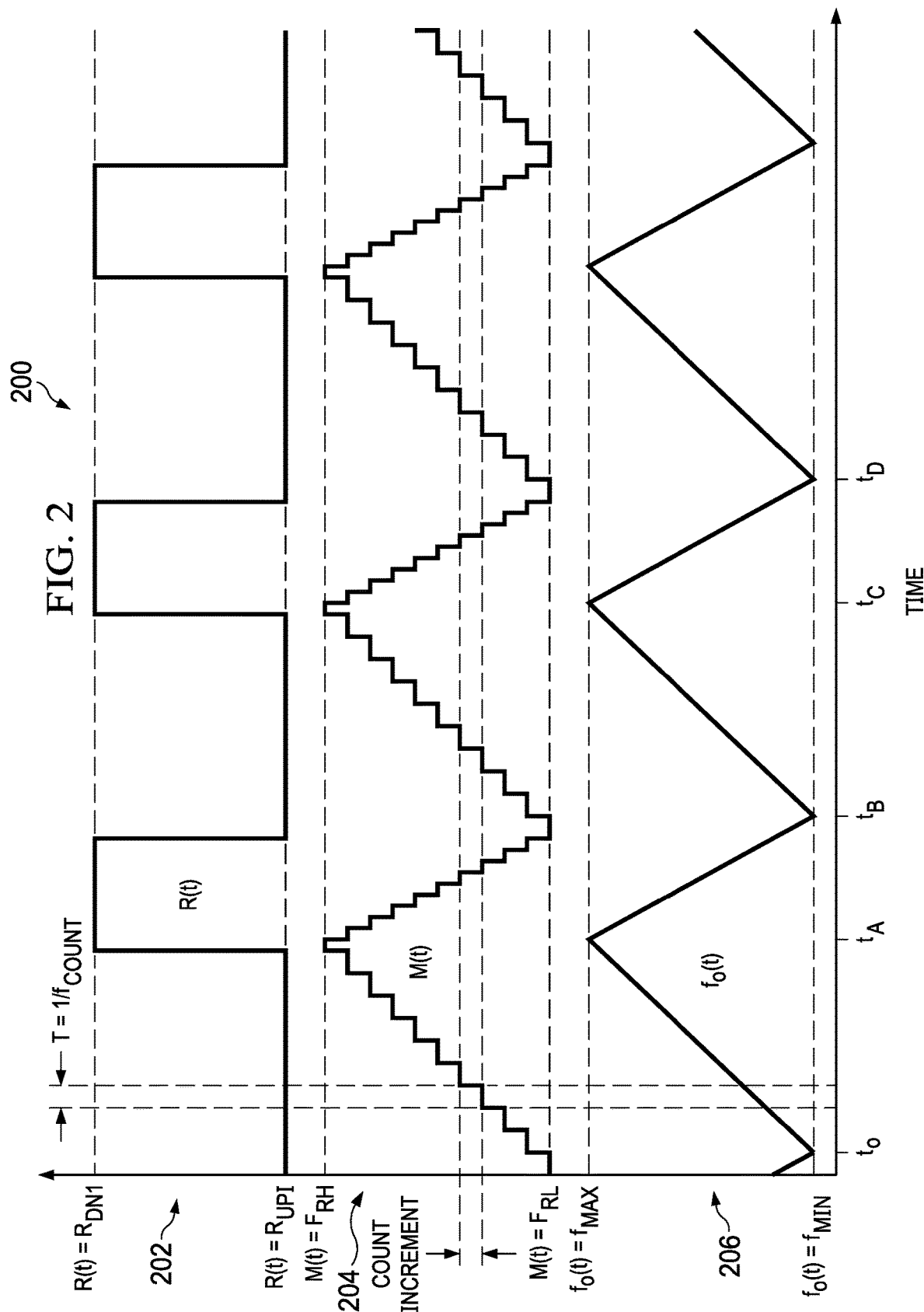
FIG. 2 is a diagram 200 showing example waveforms for a long-range transceiver or transmitter, in accordance with an example embodiment of the present disclosure.

FIG. 2 is a diagram 200 showing example waveforms for a long-range transceiver or transmitter, in accordance with an example embodiment of the present disclosure. Diagram 202 is a binary waveform representing a binary 0 or a binary 1, corresponding to the desired bit to be transmitted, in which a binary 0 corresponds to a frequency up-rate and a binary 1 corresponds to a frequency down-rate. Diagram 204 shows a signal generated by a digital multiplier, such as may be disposed inside a fractional-N phase-locked loop of long-range transceiver 120. Diagram 206 shows a frequency produced by a circuit such as long-range transceiver 120 as a result of the changing digital multiplier. The frequency response shown in diagram 206 is a smoothed version of the stair-step waveform of the signal of diagram 204. Smoothing can be performed by randomization of frequency, at a frequency that is substantially higher than a low-pass filter of a phase-locked loop in long-range transceiver 120, or in other suitable manners.

Base station 132 receives encoded signals from long-range transceiver 120 and is configured to determine whether the transmission frequency is increasing or decreasing corresponding to a respective assignment of a binary 0 or 1 to the transmission string. The measurement of a frequency ramp direction (such as by using LoRa™ technology described herein or other suitable or long-range communications technology) as opposed to measurement of a frequency change (such as is used by other standard technologies) provides for the receipt and transmission of signals with much lower power consumption. Use of LoRa™ or other suitable long-range technology can increase signal resolution by approximately 30 dB, and has power requirements that can be supported by a small printable battery 110. Furthermore, the increase in signal resolution allows transmission over long distances (such as 1 kilometer).

LoRa™ or other long-range technology can also be used to conserve power when not transmitting. Quiescent current when not transmitting is typically on the order of 10 microamperes or less for a long-range transceiver or transmitter. The low quiescent current of long-range transceiver 120 enables long battery life in conjunction with battery 110 and impedance network 112 that is configured to provide quiescent current levels as well as higher current levels required for transmission and reception. In this regard, the use of a printed battery for battery 110 as disclosed herein provides the technical feature of a battery with load characteristics that are matched to the use of a low power long-range transceiver 120, which eliminates the need for active power regulation and load management, which extends the life of battery 110.

Battery 110 can include two cells, each of which can produce a potential of approximately 1.5 V or other suitable potentials. The total voltage produced by the battery is therefore approximately 3 V. The exact cell voltage of the battery is a function of the metals used to produce the battery, and will typically be between 1.3V and 1.7V. It should be understood that other battery cell voltages and other numbers of battery cells are well within the scope of the disclosure.

Antenna 130 transmits signals from long-range transceiver 120. Antenna 130 can be an inverted-F antenna optimized for transmission of signals from long-range transceiver 120 or other suitable antennae. Antenna 130 may be printed with the same process that is used to form battery 110 and the circuit connections of transmitting tag 100. An additional antenna (not explicitly shown) and an RF switch (not explicitly shown) can also be included in transmitting tag 100 to allow efficient reception as well as transmission of signals by long-range transceiver 120.

Figure 3:
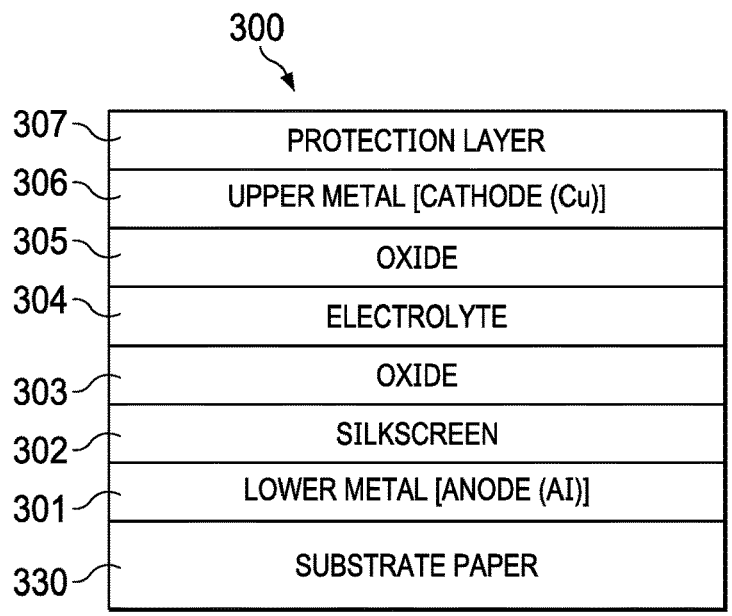
FIG. 3 is a diagram 300 showing a printed layer construction of battery 110, circuit connections, component solder pads, and antenna 130 of transmitting tag 100, in accordance with an example embodiment of the present disclosure.

FIG. 3 is a diagram 300 showing a printed layer construction of battery 110, circuit connections, component solder pads, and antenna 130 of transmitting tag 100, in accordance with an example embodiment of the present disclosure. Each layer can be printed using a screen printing process, an inkjet printer or in other suitable manners. Substrate 330 can be formed from paper or other suitable materials, and lower metal layer 301 can provide the battery anode and can be aluminum printed onto substrate 330. Likewise, additional layers of silkscreen 302, oxide 303, electrolyte 304, oxide 305, an upper metal layer 306, which can be a copper cathode, and a protection layer 307 can be printed on top of lower metal layer 301.

Figure 4:
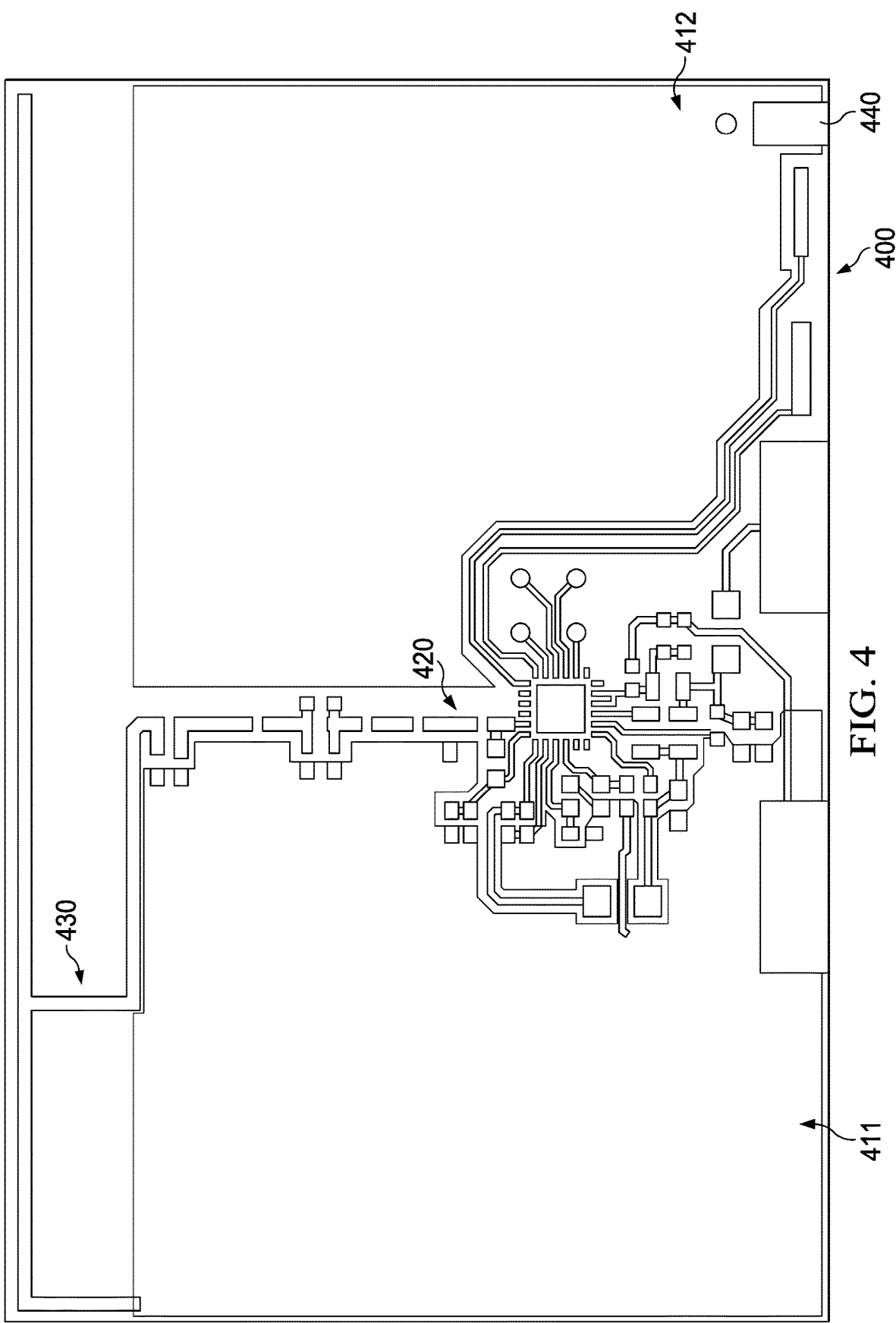
FIG. 4 is a diagram 400 of a top view of the lower metal layer 301 of transmitting tag 100, in accordance with an example embodiment of the present disclosure.

FIG. 4 is a diagram 400 of a top view of the lower metal layer 301 of transmitting tag 100, in accordance with an example embodiment of the present disclosure. Anode regions 411 and 412 can be used to form the anodes of two cells in battery 110. Component pads 420 are configured to provide pads for soldering components such as long-range transceiver 120 to metal layer 301. Inverted-F antenna 130 comprises traces 430, and is configured to transmit and receive radio frequency energy at a predetermined frequency consistent with a long-range wireless communications protocol. Pad 440 contacts anode region 412 and is configured to provide an electrical path to place the two battery cells in series.

Figure 5:
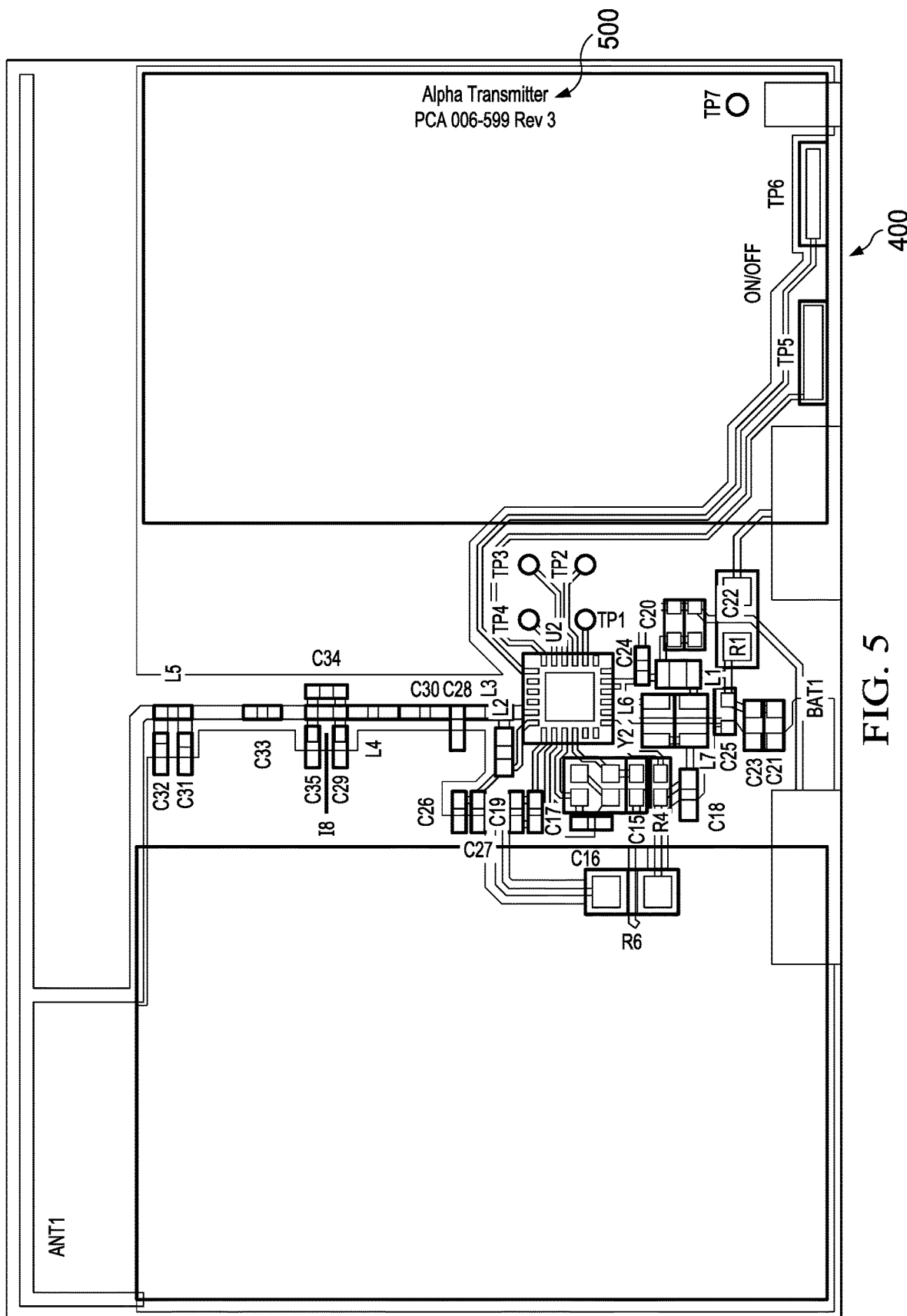
FIG. 5 is a diagram 500 of a top view of silkscreen layer 302 superimposed on top of lower metal layer 301 of the transmitting tag.

FIG. 5 is a diagram 500 of a top view of silkscreen layer 302 superimposed on top of lower metal layer 301 of the transmitting tag. While silkscreen layer 302 does not contribute to functionality of the transmitting tag, it is configured to provide additional functions to aid with manufacturing and/or debugging of transmitting tag 100, or for other suitable purposes.

Test points TP5 and TP6 provide an ON/OFF function where opening the circuit between TP5 and TP6 signals long-range transceiver 120 to transmit information. In practice, a metal strip can be placed between TP5 and TP6, which can be attached to a pull-off strip that is adhered to the substrate, where removal of the pull-off strip breaks conductivity between TP5 and TP6 and signals long-range transceiver 120 to transmit information. In another example embodiment, a sensor (such as an optical, magnetic, or temperature sensor) can be placed between TP5 and TP6 for use in sending a signal to long-range transceiver 120 to initiate information transmission, such as when a removable tab that covers the sensor or that otherwise prevents the sensor from operating is removed. Processing logic, or a processor operating under firmware control, can also be or alternatively be configured so that the contact between TP5 and TP6 is normally open, where closing the contact initiates information transmission. Likewise, other suitable functions can also or alternatively be provided.

Oxide layer 303, electrolyte layer 304, and oxide layer 305 of diagram 300 can interact chemically with metal layers 301 and 306 to form a battery, and can be applied to an area comprising anode regions 411 and 412 and the area between anode regions 411 and 412 (such as the areas that are covering the electrical components). In one embodiment, oxide layer 303, electrolyte layer 304, and oxide layer 305 are configured not to cover TP5, TP6, and the battery contacts of diagram 400. The electrical components of transmitting tag 100 can be soldered onto metal layer 301 prior to applying oxide layer 303, electrolyte layer 304, and oxide layer 305.

Upper metal layer 306 comprises the cathode of battery 110. Upper metal layer 306 can be formed from copper, silver or other suitable material that provides an electrochemical voltage difference in conjunction with the anode metal. Upper metal layer 306 can be applied to areas above anode regions 411 and 412. An additional metal contact (not shown) can be configured to connect the cathode of the cell above anode region 411 to the anode of the cell above anode region 412 through pad 440, or for other suitable purposes.

Figure 6:
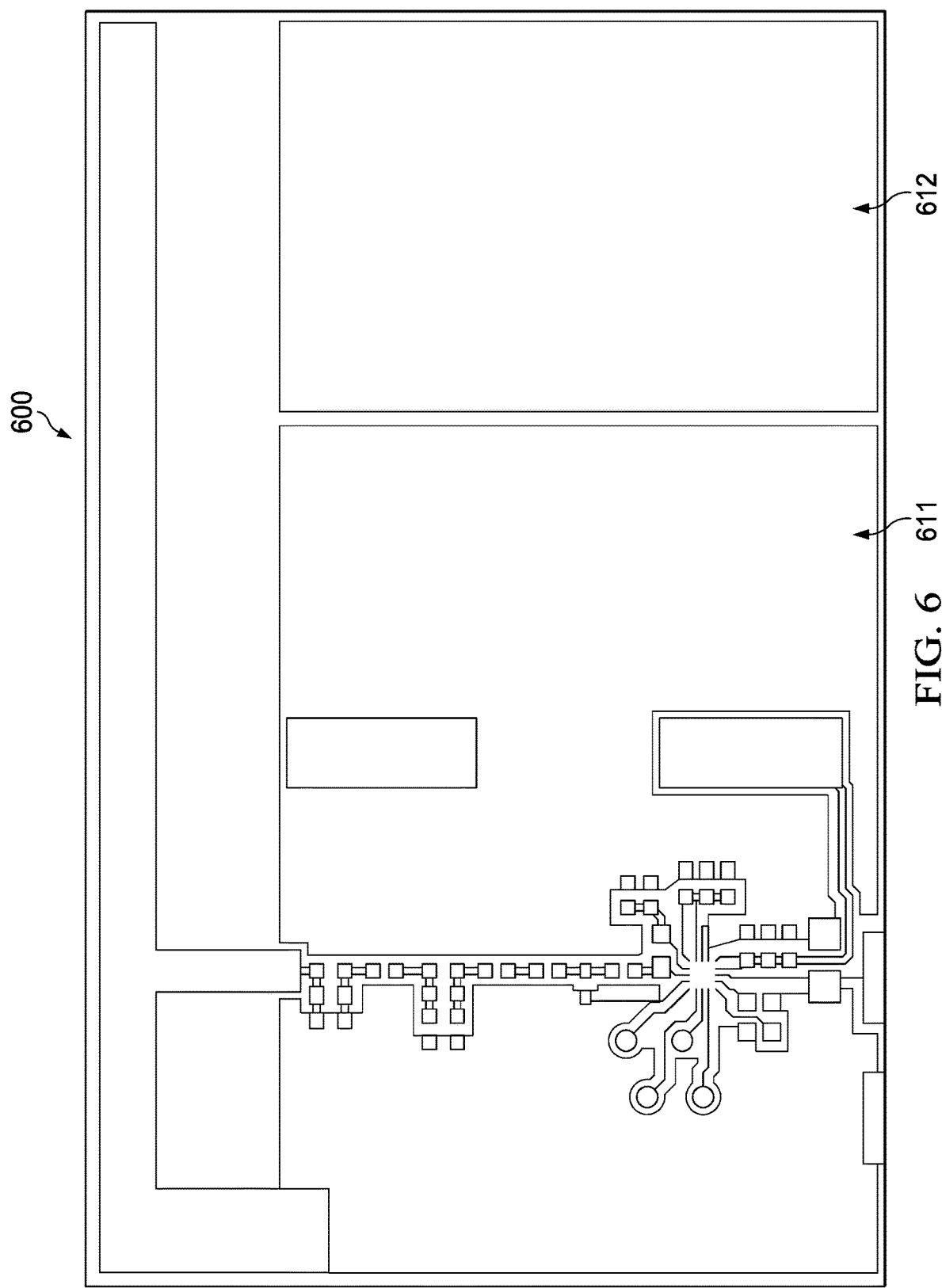
FIG. 6 is a diagram 600 of an example embodiment of lower metal layer 300 with anodes of battery cells 611 and 612 adjacent to each other.

FIG. 6 is a diagram 600 of an example embodiment of lower metal layer 300 with anodes of battery cells 611 and 612 adjacent to each other, unlike battery cell anode regions 411 and 412, which straddle other electronic parts. In this example embodiment, the oxide and electrolyte layers of the battery corresponding to diagram 600 occupy space above battery cells 611 and 612, whereas the oxide and electrolyte layers of the battery of diagram 400 occupy anode regions 411 and 412, and all of the area between anode regions 411 and 412 (i.e. above the electronic components). This configuration allows electronic parts to be soldered to the metal pads of diagrams 600 and 700 either before or after the rest of the battery is printed, whereas the electronic parts for the structure shown in diagram 500 can be soldered prior to printing the balance of the battery.

Figure 7:
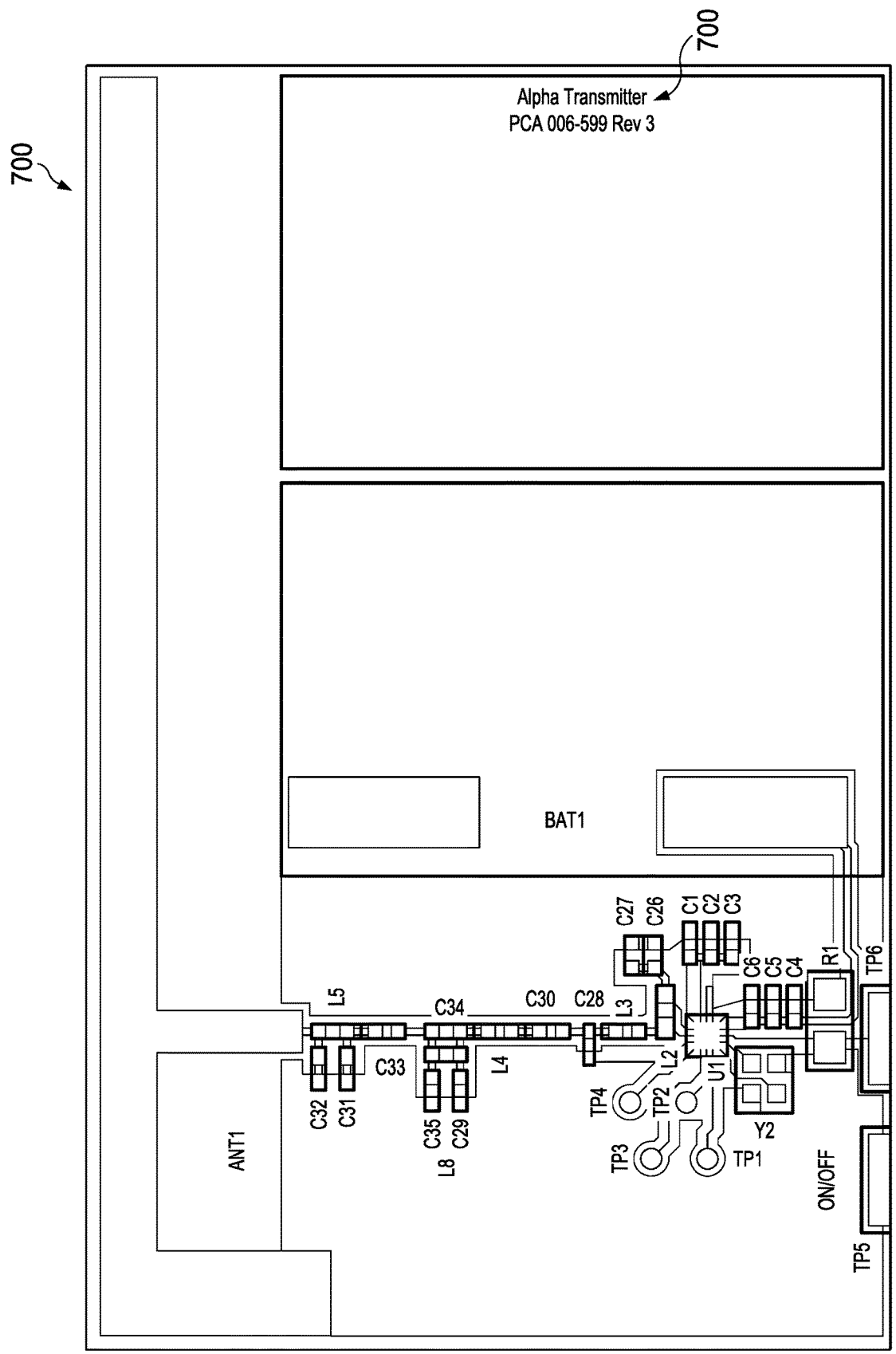
FIG. 7 is a diagram of an example embodiment of lower metal layer with anodes of battery cells and adjacent to each other, unlike battery cell anode regions, which straddle other electronic parts.

FIG. 7 is a diagram 700 of an example embodiment of lower metal layer 300 with anodes of battery cells 611 and 612 adjacent to each other, unlike battery cell anode regions 411 and 412, which straddle other electronic parts. In this example embodiment, the oxide and electrolyte layers of the battery corresponding to diagram 600 occupy space above battery cells 611 and 612, whereas the oxide and electrolyte layers of the battery of diagram 400 occupy anode regions 411 and 412, and all of the area between anode regions 411 and 412 (i.e. above the electronic components). This configuration allows electronic parts to be soldered to the metal pads of diagrams 600 and 700 either before or after the rest of the battery is printed, whereas the electronic parts for the structure shown in diagram 500 can be soldered prior to printing the balance of the battery.

Figure 8A:
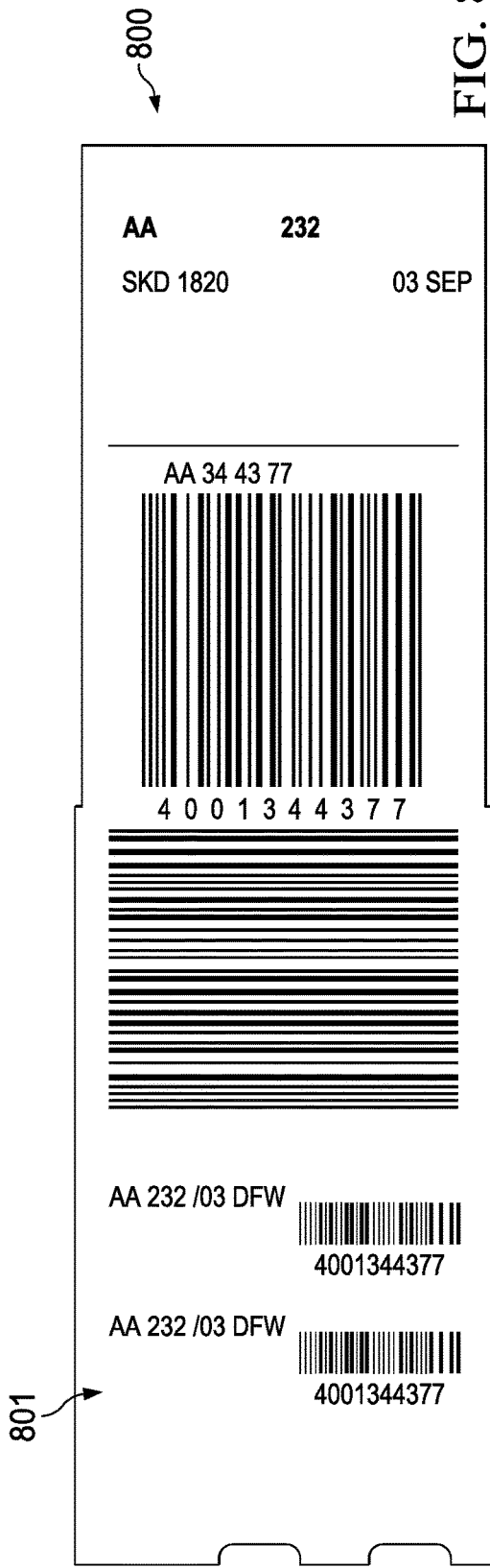
FIGS. 8A and 8B are top and bottom views, respectively, of an airline baggage tag 800 in accordance with an example embodiment of the present disclosure.
Figure 8B:
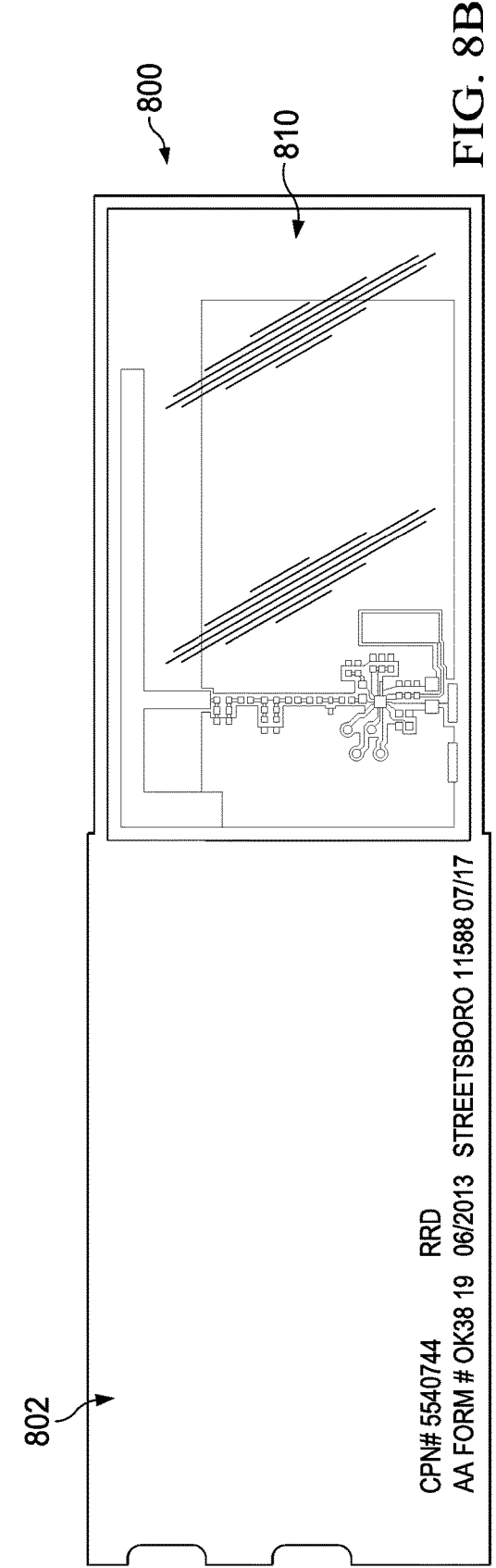

FIGS. 8A and 8B are top and bottom views, respectively, of an airline baggage tag 800 in accordance with an example embodiment of the present disclosure. Top side 801 of airline baggage tag 800 resembles a traditional airline baggage tag and can include a bar code, name, flight and other suitable information. Bottom side 802 can include transmitting tag 810. Airline baggage tag 800 can be configured with a pull tab (not explicitly shown) that can be removed from tag 800, which can momentarily or permanently complete an ON/OFF circuit in transmitting tag 810. Airline baggage tag 800 can further be configured to provide regular transmit updates, thus allowing a receiver to determine a location of an item of baggage that airline baggage tag 800 is attached to.

Figure 9:
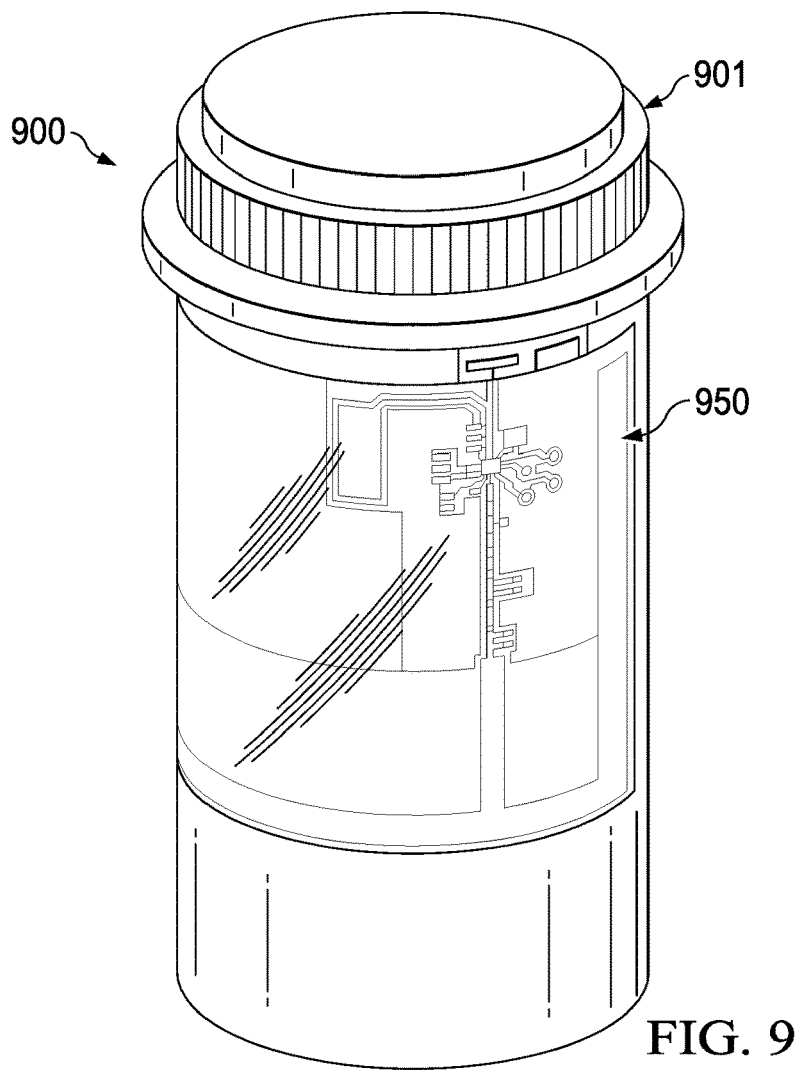
FIG. 9 is a diagram of a pill dispenser 900 with a transmitting tag 950, in accordance with an example embodiment of the present disclosure.

FIG. 9 is a diagram of a pill dispenser 900 with a transmitting tag 950, in accordance with an example embodiment of the present disclosure. Pill dispenser 900 comprises twist-top 901 and transmitting tag 950, and is configured so that when twist-top 901 is removed, an ON/OFF circuit in transmitting tag 950 is opened, such as by removing an insulating material from between two conductors or in other suitable manners, so as to enable transmitting tag 950 to transmit information to a receiver indicating that the pill dispenser has been opened. Likewise, when twist-top 901 is replaced, transmitting tag 950 can be turned off, such as by replacing the insulating material between the two conductors. It is thus possible to keep track of dosage occurrences of medication contained within pill dispenser 900.

While the example embodiments have been provided to explain the inventive concepts of the present disclosure, the inventive concepts are not limited to those example embodiments. For example, antenna 130 is not limited to an inverted-F antenna, and other suitable antenna designs can also or alternatively be used. Another example embodiment of the disclosed transmitting tag includes a credit card with an attached transmitting tag that is configured to send location information to verify a proper recipient of the credit card when a recipient removes the credit card from an attached paper and causes a conducting path to be formed. Those skilled in the art will understand that the disclosed example embodiments of the transmitting tag and related functions and methods of operating the same are submitted for illustrative purposes only.

Also, although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Having thus described one or more embodiments of the disclosure, what is claimed as new and desired to be protected by Letters Patent includes the following:

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system comprising
   a printed circuit connection layer formed in one of an anode or a cathode;
   a printed antenna formed in one of the anode or the cathode;
   a low-power transmitter coupled to the circuit connection layer; and
   a removable tab configured to activate the low-power transmitter upon removal.

2. The system of claim 1, wherein the low-power transmitter comprises a fractional-N phase-locked loop transceiver.

3. The system of claim 1, wherein the removable tab comprises an insulator disposed between a first conductor and a second conductor.

4. The system of claim 1, wherein the removable tab is configured to be replaced after removal.

5. The system of claim 1, further comprising an identification device coupled to the tag.

6. The system of claim 1, wherein the removable tab is coupled to a removable container cover and is configured to activate the low power transmitter when the removable container cover is removed from the container.

7. The system of claim 1, further comprising a financial authorization device coupled to the removable tab.

8. The system of claim 1, wherein the low power transmitter is configured to transmit location data.

9. The system of claim 1, wherein the removable tab covers a light sensor.

10. The system of claim 1, wherein the removable tab is configured to allow a magnetic field sensor to operate when removed.

11. A method of manufacturing a system, comprising:
    forming a first metallic layer on a paper substrate;
    forming a first oxide on the first metal layer;
    forming an electrolyte layer on the oxide layer;
    forming a second oxide layer on the electrolyte layer; and
    forming a second metallic layer on the second oxide layer.

12. The method of claim 11 further comprising coupling a circuit to one of the first metallic layer or the second metallic layer.

13. The method of claim 11, wherein forming the first metallic layer comprises forming a plurality of circuit connection pads.

14. The method of claim 12, wherein coupling the circuit to one of the first metallic layer or the second metallic layer comprises coupling the circuit to the circuit connection pads of the first metallic layer.

15. The method of claim 13 wherein forming the second metallic layer comprises forming a plurality of circuit connection pads.

16. The method of claim 15 wherein coupling the circuit to one of the first metallic layer or the second metallic layer comprises coupling the circuit to the circuit connection pads of the second metallic layer.

17. The method of claim 11 wherein forming the first metallic layer comprises forming an antenna as part of the first metallic layer.

18. The method of claim 11 wherein forming the second metallic layer comprises forming an antenna as part of the second metallic layer.

19. A method of manufacturing a system, comprising:
    forming a first metallic layer on a paper substrate;
    soldering one or more circuit components to the first metallic layer;
    forming a first oxide on the first metal layer;
    forming an electrolyte layer on the oxide layer;
    forming a second oxide layer on the electrolyte layer; and
    forming a second metallic layer on the second oxide layer.

20. The method of claim 19 further comprising coupling a circuit to one of the first metallic layer or the second metallic layer.

* * * * *